United States Patent Office ==

3,637,668
Patented Jan. 25, 1972

3,637,668
N-SUBSTITUTED 4-AMINOSTEROIDS
Henry Laurent, Hermann Steinbeck, and Rudolf Weichert, Berlin, Germany, assignors to Schering Aktiengesellschaft, Berlin, Germany
No Drawing. Filed Feb. 27, 1969, Ser. No. 803,058
Claims priority, application Germany, Feb. 29, 1968,
P 16 68 689.8, P 16 68 690.1
Int. Cl. C07c 173/00
U.S. Cl. 260—239.5    32 Claims

ABSTRACT OF THE DISCLOSURE 4-aminosteroids of the partial formula

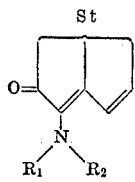

(I)

wherein $R_1$ and $R_2$ are alkyl or substituted alkyl and wherein $R_1$ and $R_2$, together with the nitrogen which is attached in the 4-position, may form an additional ring and wherein said additional ring may include a further hetero atom or a positive nitrogen and wherein St is a steroid molecule residue. The compounds have particular use as progestational agents. The compounds of the androstane series have androgenous, anabolic and antiestrogenic properties.

The compounds are made by bringing a 6β,7α-diholo-genosteroid of the partial formula

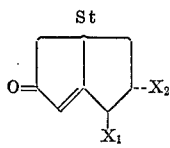

(II)

wherein $X_1$ and $X_2$ are chlorine or bromine in reaction with an amine of the formula $R_1R_2NH$, wherein $R_1$ and $R_2$ have the same meaning as above.

BACKGROUND OF THE INVENTION

Compounds having a strong progestational action are known. Such compound is for instance 6-chloro-17-acetoxy-4,6 - pregnadiene - 3,20-dione. It is, however, of interest to obtain compounds with a stronger progestational activity and in addition compounds which do not have any antiondrogenous side effects. The obtaining of such compounds is one of the objects of the invention. Another object is to obtain compounds of the type indicated which also are free of central blocking effect, that is, ovulation blocking.

SUMMARY OF THE INVENTION

These objects are met by N - substituted 4 - aminosteroids of the general partial Formula I

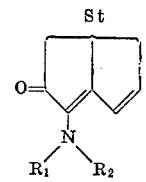

(I)

wherein $R_1$ and $R_2$ are alkyl or substituted alkyl and wherein $R_1$ and $R_2$, together with the nitrogen which is attached in the 4-position, may form an additional ring and wherein said additional ring may include a further hetero atom or a positive nitrogen and wherein St is a steroid molecule residue.

The invention also embraces a process for making these compounds by subjecting corresponding 6β,7α-dihalogenosteroids of the partial Formula II

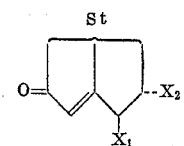

(II)

wherein $X_1$ and $X_2$ are chlorine or bromine to reaction with an amine of the formula $R_1R_2NH$, wherein $R_1$ and $R_2$ have the meaning as above given.

DESCRIPTION OF THE PREFERRED EMBODIMENTS

Starting products

As indicated, the process of making the compounds of the invention proceeds from 6,7 - dihalogenosteroids. These dihalogenosteroids may contain further substituents and/or double bonds. For instance, the process can start from pregnane derivatives which, in the 17-position, have a progesterone-hydroxyprogesterone-, corticosterone- or Reichstein-S- side chain. The hydroxyl groups in these side chains may preferably be present in functionally modified form, for instance as acylates or as bismethylenedioxy groups.

Analogous suitable starting products are also the androstane derivatives irrespective of whether, in the 17-position, they have a keto-, hydroxyl-, acyloxy-, or a

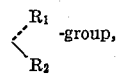

in which latter case $R_1'$ may be a saturated or unsaturated alkyl residue and $R_2'$ may be a free or functionally modified hydroxyl group. The substituents such as alkyl, alkyldene, hydroxyl, amino, mercapto and/or cyano groups may be present in one or several of the positions 1, 2, 11, 12, 14, 16 and 17. These substituents can also be present in their functionally modified form.

For instance, the hydroxyl, mercapto and amino groups may be alkylated or acylated. Hydroxyl groups which are attached to two adjacent carbon atoms may be present as a cyclical acetal with a carbonyl compound. The starting products may also include halogen in the 2-position, fluorine in the 9- and/or 21-position, keto groups in the 1-and/or 11-position, methylene groups in 1,2- and/or 16,17- or 15,16-position or double bonds in 1(2)- and 9(11)-position. The corresponding steroid compounds of the 19-nor and/or 18-homo series are likewise suitable.

The preferred starting products have the Formula IIa

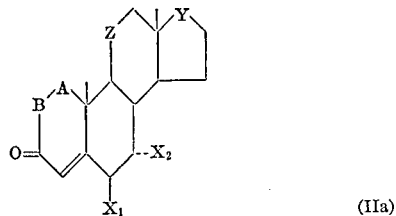

(IIa)

wherein $X_1$ and $X_2$ are as indicated chlorine or bromine and wherein

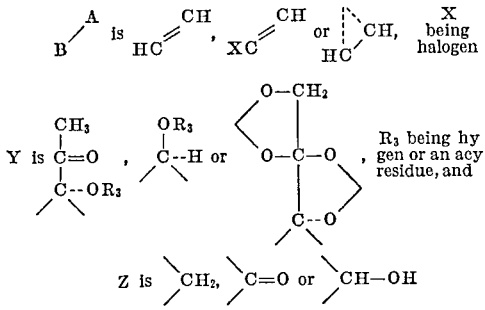

The amino reagent used in the reaction which has the form $R_1R_2NH$ preferably are secondary aliphatic and cyclic amines such as diethylamine, pyrrolidine, piperidine, piperazine, N-substituted piperazines, morpholine, etc.

Process of making the compounds

It was unexpected and surprising that the reaction of $6\beta,7\alpha$-dihalogenosteroids with amines led to 4-aminosteroids. One should rather have expected a simple splitting off of a halogen acid (HX) and the formation of a 6-halogeno-$\Delta^{4,6}$-steroid. Actually, if the reaction proceeds from 6,7-dihalogenosteroids which have chlorine in the 6-position, the expected 6-chloro-$\Delta^{4,6}$-steroid is formed as a by-product. In case of the 6,7-dibromo compound, however, the 4-amino compound is the sole reaction product. The 6,7-dibromo compounds are therefore the preferred starting products for the invention.

The reaction of the 6,7-dihalogeno steroids with the amines can be effected in a simple manner by heating the components together. The excess amine is preferably used as the solvent in the reaction. However, the reaction can also be carried out in a diluted solution. As diluents there can be used inert organic, preferably water-miscible, solvents such as tetrahydrofuran or alcohols.

The process of the invention takes place under surprisingly mild conditions. It is usually sufficient to react the components for a few minutes to between 50 and 120° C.

Compounds which contain a free hydroxyl group in the 17-position can then be esterified in conventional manner. Compounds which contain an ester group in the 17-position can likewise be saponified in conventional manner.

4-amino steroids which contain a further nitrogen atom in the amine component can be modified by treatment with an organic or inorganic acid so as to form the corresponding acid addition salts.

Final compounds

The final compounds of the invention may for instance have the following Formula Ia

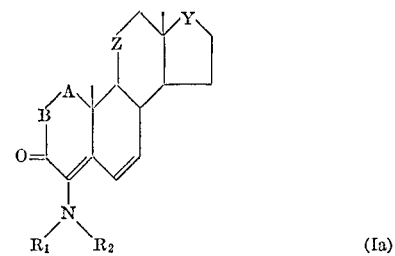

(Ia)

wherein $R_1$ and $R_2$ have the meaning as above indicated and wherein

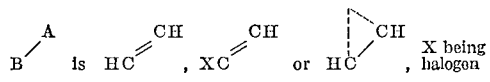

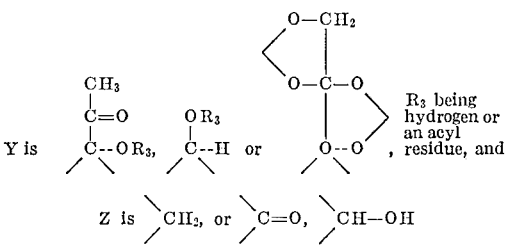

If $R_3$ is an acyl residue, it should be derived from physiologically compatible acids. The preferred acids are carboxylic acids having up to 15 carbon atoms. The carboxylic acid can also be unsaturated, branched, polyhydroxylic or substituted in the usual manner, for instance by hydroxy, oxo, amino groups or halogen atoms. Suitable are also cycloaliphatic aromatic mixed aromatic-aliphatic or heterocyclic acids which likewise may be substituted in a suitable manner. Examples of such acids are the following: acetic acid, propionic acid, butyric acid, valerianic acid, caproic acid, enanthic acid, undecylic acid, trimethylacetic acid, diethylacetic acid, t-butylacetic acid, phenylacetic acid, cyclopentylpropionic acid, oleic acid, lactic acid, mono-, di- and trichloroacetic acid, aminoacetic acid, succinic acid, adipic acid, benzoic acid, and nicotinic acid. The usual inorganic acids such as sulfuric nitric and phosphoric acid may also be used.

If $R_1$ and $R_2$ are connected to form a ring upon inclusion of a positive nitrogen atom, acid addition salts of organic or inorganic acids may be formed.

Utility

The 4-aminosteroids of the Formula I of the invention are valuable hormone agents. They have therefore pharmaceutically valuable properties. They have in general strong progestational action. The compounds of the invention which belong to the androstone series are distinguished by androgenic, anabolic and antiestrogenic properties.

Of particular interest is the very strong progrestational activity of the compounds of the pregnane series. The progestational agents of the invention have virtually no antiandrogenic action, which is a most undesirable side effect of many progrestational compositions.

The compounds of the invention surprisingly have no central blocking action, that is, ovulation blocking, even when administered in high doses.

The following table illustrates the superiority of a compound of the invention, to wit, 4-piperidino-17-acetoxy- 1α,2α-methylene-4,6-pregnadiene-3,20-dione (I) over the compound used as comparison, that is 6-chloro-17-acetoxy-4,6-pregnadiene-3,20-dione (II) which itself already has a strong progestational action:

| | Clauberg Test, p.o. limit value (mg.) | Ovulation blocking, p.o. | | Antiandrogenous test, p.o. | | |
|---|---|---|---|---|---|---|
| | | | | | Blocking (percent) | |
| | | Dose (mg.) | Blocking (percent) | Dose (mg.) | Sem. vesc. | Prost. |
| Compound: | | | | | | |
| I | 0.01 | 3 | 0 | 3 | 11 | 73 |
| | | | | 1 | 2 | 0 |
| II | 0.03 | 1-3 | 50 | 3 | 44 | 45 |
| | | | | 1 | 18 | 15 |

The progestational action was determined by the Clauberg Test as customary. The limit value was determined by the total dose at which a transformation conversion of the endometrium occurs in at least 2 out of 3 rabbits.

The ovulation blocking was determined by tubular inspection. In order to test the antiandrogenic side effects, the castrated male rats received for a period of 7 days a daily dose of the compound to be tested by oral administration (p.o.). The animals received through the same period a daily dose of 0.1 mg. testosterone propionate by subcutaneous injection. The animals were then killed on the eighth day, and the weight of the sex glands was determined. The percentage blocking of the growth caused by the test compound of the seminal vescicle (sem. vesc.) and the prostate gland (prost.) were then determined.

The table shows that the compound I of the invention has a progestational action three times stronger than the comparison compound II and still has not as much central and antiandrogenic side effects as the comparison compound.

The main use of the compounds of the invention is in the treatment of the following gynecological afflictions: primary amenorrhea and secondary amenorrhea of prolonged duration, cyclical afflictions in case of inadequate function of the corpus luteum, endometriosis, uterine hypoplasia, premenstrual complaints and mastopathy.

Pharmaceutical compositions

The dosage depends on the gravity of the individual illness. Generally, the dose should be between 5 and 100 mg. daily. The pharmaceutical compositions are made in the usual manner by combining the active agents with suitable additives, carriers and flavoring additives to form commercially acceptable pharmaceutical compositions. For the oral applications, the compositions will be mainly in the form of tablets, coated tablets lozenges, capsules, pills, suspensions or solutions. For the parenteral applications, oily solutions may be used for intramuscular injection.

The concentration of the active agent in the pharmaceutical composition depends on the type of application. For instance capsules or tablets should preferably contain 0.5 to 10 mg. per unit, and solutions should contain about 1 to 20 mg./ml. of solution for parenteral application.

The acid addition salts such as the 4-piperazino-17-acetoxy-1α,2α-methylene-4,6-pregnadiene - 3,20 - dione-hydrochloride can be used for intravenous administration in the form of an aqueous solution where it is indicated to forestall an imminent miscarriage.

The following are illustrative of specific pharmaceutical compositions:

(A) Gelatin capsules at 1 ml. active agent each (per capsule)

| | Mg. |
|---|---|
| 4 - piperidino - 17 - acetoxy - 1α,2α-methylene-4,6-pregnadiene - 3,20 - dione, micronized (particle size about 2–8μ) | 1 |
| Lactose (DAB 6) | 208 |
| | 209 |

The substances are mixed until a homogeneous mixture is formed and are then put into the customary hard gelatinous push-fit capsules.

(B) Tablets at 5 mg. active agent each (per tablet)

| | Mg. |
|---|---|
| 4 - piperidino - 17 - acetoxy - 1α,2α - methylene-4,6 - pregnadiene - 3,20 - dione, micronized (particle size about 2–8μ) | 5.000 |
| Lactose (DAB 6) | 24.000 |
| Corn starch (USP 16) | 45.065 |
| Talcum (DAB 6) | 4.000 |
| Gelatin (white) (DAB 6) | 1.400 |
| Sodium laurylsulfate (USP 16) | 0.500 |
| P-hydroxybenzoic acid methylester (DAB 6, 3. Suppl.) | 0.024 |
| P-hydroxybenzoic acid propylester (DAB 6, 3. Suppl.) | 0.011 |
| | 80.000 |

Lactose, corn starch, talcum, gelatin and sodium laurylsulfate are fillers; p-hydroxybenzoic acid methylester and p-hydroxybenzoic acid propylester are added as preservatives.

The tablets are made as customary on a tablet press.

(C) Ampoules with oily solutions for intramuscular injections may for instance contain 1 or 2 mg. of effective agent per milliter of solution. For this purpose 200 mg. of 4 - piperidino - 17 - acetoxy-1α,2α-methylene-4,6-pregnadiene - 3,20 - dione are dissolved in sesame oil/benzyl alcohol (50:1) to bring the solution up to 100 ml. The solution is then put in 1 ml. ampoules and sterilized in conventional manner.

Starting products

The 6β,7α-dihalogeno steroids of the Formula II which are used as starting products and have not yet been described in the literature may be made from the corresponding Δ⁶-unsaturated steroids by halogen addition.

There may be obtained for instance the following:
6β,7α - dibromo - 17 - acetoxy - 1α,2α-methylene-4-pregnene - 3,20 - dione; M.P. 150–151.5° C. from 17-acetoxy - 1α,2α - methylene-4,6-pregnadiene-3,20-dione with N-bromosuccinimide and lithium bromide in the presence of hydrogen chloride saturated tetrahydrofuran in acetic acid.

6β,7α-dichloro-17-acetoxy-1α,2α - methylene - 4 - pregnene-3,20-dione; M.P. 247–248° C. from 17-acetoxy-1α,2α-methylene - 4,6 - pregnadiene-3,20-dione with N-chlorosuccinimide and lithium chloride in the presence of hydrogen chloride saturated tetrahydrofuran in acetic acid.

6β-chloro-7α-bromo - 17 - acetoxy-1α,2α-methylene-4-pregnene-3,20-dione; M.P. 208–211.5° C. from 17-acetoxy-1α,2α-methylene-4,6-pregnadiene-3,20-dione with N-bromosuccinimide and lithium chloride in the presence of hydrogen chloride saturated tetrahydrofuran in acetic acid.

6β,7α-dibromo - 17 - hexanoyloxy-1α,2α-methylene-4-pregnane-3,20-dione in the form of an oil from 17-hexanoyloxy-1α,2α-methylene - 4,6 - pregnadiene-3,20-dione with N-bromosuccinimide and lithium bromide in the presence of hydrogen chloride in acetic acid.

6β,7α - dibromo-17β-acetoxy-1α,2α-methylene-4-androstene-3-one, M.P. 172° C. (decomposition) from 17β- acetoxy-1α,2α-methylene-4,6-androstadiene-3-one with N-bromosuccinimide and lithium bromide in the presence of hydrogen chloride in acetic acid.

6β,7α - dibromo-17,20;20,21-bismethylenedioxy-1α,2α-methylene-4-pregnene-3-one, M.P. 157–165° C. (decomposition) from 17,20;20,21 - bismethylenedioxy - 1α,2α-methylene-4,6-pregnadiene-3-one with N-bromosuccinimide and lithium bromide in the presence of hydrogen chloride in acetic acid.

6β,7α-dibromo - 17 - acetoxy - 1,4 - pregnadiene-3,20-dione, M.P. 160–165° C. (decomposition) from 17-acetoxy-1,4,6-pregnatriene-3,20-dione with bromine and lithium bromide in the presence of hydrogen chloride in acetic acid.

2,6β,7α - tribromo - 17 - acetoxy-1,4-pregnadiene-3,20-dione, M.P. 188–192° C. (decomposition) from 17-acetoxy-1,4,6-pregnatriene-3,20-dione with N-bromosuccinimide and lithium bromide in the presence of hydrogen chloride in acetic acid.

6β,7α - dibromo - 17,20;20,21 - bismethylenedioxy-1,4-pregnadiene-3-one, M.P. 173–175° C. from 17,20;20,21-bismethylenedioxy-1,4,6-pregnatriene-3-one with N-bromosuccinimide and lithium bromide in the presence of hydrogen chloride in acetic acid.

6β,7α-dibromo - 17,20;20,21 - bismethylenedioxy-1α,2α-methylene - 4 - pregnene-3,11-dione from 17,20;20,21-bismethylenedioxy-1α,2α-methylene - 4,6 - pregnadiene-3,11-dione with N-bromosuccinimide and lithium bromide in the presence of hydrogen chloride saturated dioxane in acetic acid.

6β,7α-dibromo-17β-acetoxy - 1,4 - androstadiene-3-one from 17β-acetoxy-1,4,6-androstatriene - 3 - one with bromine and lithium bromide in the presence of hydrogen chloride in acetic acid.

The following examples illustrate the invention.

EXAMPLE 1

2.0 g. of 6β,7α-dibromo-17-acetoxy-1α,2α-methylene-4-pregnene-3,20-dione were dissolved in 40 ml. piperidine. The solution is heated to 80° C. for 15 minutes, then reacted with water whereupon the precipitated crude product is removed by filtration and dried. After recrystallization from acetone/hexane, there are obtained 1.31 g. of 4-piperidino - 17 - acetoxy-1α,2α-methylene-4,6-pregnadiene-3,20-dione, M.P. 231–232.5° C.

UV: $\epsilon_{282}=14,600$, $\epsilon_{395}=1,650$ (acetonitrile).

EXAMPLE 2

2.0 g. 6β,7α-dibromo - 17 - acetoxy-1α,2α-methylene-4-pregnene-3,20-dione were dissolved in 40 ml. morpholine and heated for 10 minutes to 90° C. The solution is reacted with water and the precipitated crude product is removed by filtration and dried. After recrystallization from methanol/methylene chloride, there are obtained 1.10 g. of 4-morpholino-17-acetoxy-1α,2α-methylene-4,6-pregnadiene-3,20-dione; M.P. 244–247° C.

UV: $\epsilon_{282}=15,000$, $\epsilon_{389}=1,520$ (acetonitrile).

EXAMPLE 3

1.0 g. 6β,7α-dibromo - 17 - acetoxy-1α,2α-methylene-4-pregnene-3,20-dione is dissolved in 10 ml. pyrolidine and heated to 90° C. for 15 minutes. The solution is reacted with water and the precipitated crude product after drying is subjected to chromatography through silica gel. With 0.5 to 1.2% ether/methylene chloride, there are obtained after recrystallization from acetone/hexane 269 mg. of 4-pyrrolidino - 17 - acetoxy-1α,2α-methylene-4,6-pregnadiene-3,20-dione; M.P. 219–220° C.

UV: $\epsilon_{283}=15,200$, $\epsilon_{389}=2,160$ (acetonitrile).

EXAMPLE 4

750 mg. 6β,7α-dichloro-17-acetoxy-1α,2α-methylene-4-pregnene-3,20-dione are heated as described in Example 1 for 2 hours in piperidine and then subjected to further treatment. The crude product is purified by means of preparative layer chromatography through silica gel (developer: 5x chloroform). After recrystallization from acetone/hexane there are obtained 200 mg. of 4-piperidino-17 - acetoxy - 1α,2α - methylene - 4,6 - pregnadiene-3,20-dione; M.P. 231.5–234.5° C.

UV: $\epsilon_{232}=15,200$, $\epsilon_{392}=1,780$ (acetonitrile).

The same four piperidino compounds can be formed in an analogous manner from 6β-chloro-7α-bromo-17-acteoxy-1α,2α-methylene-4-pregnene-3,20-dione.

EXAMPLE 5

A solution of 300 mg. of 4-piperidino-17-acetoxy-1α,2α-methylene-4,6-pregnadiene-3,20-dione in 6 ml. ethanol and 15 ml. acetone is reacted with the solution of 300 mg. potassium hydroxide in 1 ml. water and is subjected to stirring at room temperature for 19 hours in a nitrogen atmosphere. It is then poured into ice water, acidified with dilute acetic acid, the precipitate then removed by filtration, washed neutral with water and dried in a vacuum. The crude product is purified by means of preparative layer chromatography through silica gel (developer 5x chloroform). There are obtained after recrystallization from a acetone/hexane 181 mg. 4-piperidino-17-hydroxy-1α,2α-methylene-4,6-pregnadiene-3,20-dione; M.P. 147–148° C. (decomposition).

UV: $\epsilon_{283}=14,100$, $\epsilon_{394}=1,770$ (acetonitrile).

EXAMPLE 6

2.0 g. of 6β,7α-dibromo-17-hexanoyloxy-1α,2α-methylene-4-pregnene-3,20-dione are heated to boiling point in a mixture of 40 ml. diethylamine and 10 ml. tetrahydrofuran for on hour. The reaction mixture is then reacted with water and extracted with methylene chloride. The extact is washed with water, dried over sodium sulfate and concentrated in a vacuum. The crude product is subjected to chromatography through silica gel. With 8–11% acetone/hexane there are obtained 992 mg. 4-diethylamino-17-hexanoyloxy-1α,2α-methylene-4,6 - pregnadiene - 3,20-dione in the form of a high viscous oil.

UV: $\epsilon_{281}=14,800$, $\epsilon_{392}=1,620$ (acetonitrile).

EXAMPLE 7

2.1 g. of 6β,7α-dibromo-17β-acetoxy-1α,2α-methylene-4-androstene-3-one are heated with 42 ml. piperidine to 90° C. for 15 minutes. The solution is reacted with water and the precipitated crude product after drying is recrystallized from acetone/hexane. There are obtained 1.46 g. of 4-piperidino-17β-acetoxy-1α,2α-methylene-4,6- androstadiene-3-one M.P. 215.5–217° C.

UV: $\epsilon_{282}=14,900$, $\epsilon_{394}=1,820$ (acetonitrile).

EXAMPLE 8

3.0 g. of 6β,7α-dibromo-17β-acetoxy-1α,2α-methylene-4-androstene-3-one are heated to 70° C. for 20 hours in a mixture of 60 ml. diethylamine and 15 ml. tetrahydrofuran. The reaction mixture is then reacted with water and extracted with methylene chloride. The organic phase is washed with water, dried over sodium sulfate and concentrated in a vacuum. The residue is subjected to chromatography. 3.3–4.8% acetone/pentane effect elution of 800 mg. 4-diethylamino-17β-acetoxy-1α,2α-methylene-4,6-androstadiene-3-one; M.P. 132–133° C. (from acetone/hexane).

UV: $\epsilon_{284}=17,400$, $\epsilon_{397}=1,220$ (acetonitrile).

EXAMPLE 9

1.5 g. of 6β,7α-dibromo-17,20; 20,21-bismethylenedioxy-1α,2α-methylene-4-pregnene-3-one are reacted as described in Example 2 with morpholine. The crude product is recrystallized from acetone/hexane. There are obtained 798 mg. of 4-morpholino17,20; 20,21-bismethylenedioxy- 1α,2α-methylene-4,6-pregnadiene-3-one; M.P. 242–247.5° C.

UV: $\epsilon_{283}=15,100$, $\epsilon_{382}=1,630$ (acetonitrile).

EXAMPLE 10

1.5 g. of 6β,7α-dibromo-17-acetoxy-1,4-pregnadiene-3,20-dione are reacted with piperidine as described in Example 1. The crude product is recrystallized from acetone/hexane. There are obtained 1.05 g. of 4-piperidino-17-acetoxy-1,4,6-pregnatriene-3,20-dione; M.P. 268.5–271.5° C. (decomposition).

UV: $\epsilon_{228}=13,000$, $\epsilon_{301}=8,650$, $\epsilon_{420}=937$ (acetonitrile).

EXAMPLE 11

2.0 g. of 2,6β,7α-tribromo-17-acetoxy-1,4-pregnadiene-3,20-dione are reacted with piperidine as described in Exampl 1. The crude product is subjected to chromatography through silica gel. With 4.9–6.0% acetone/pentane there are obtained, after recrystallization from acetone/hexane, 1.26 g. of 2-bromo-4-piperidino-17-acetoxy-1,4,6-pregnaetriene-3,20-dione; M.P. 212–213° C. (decomposition).

UV: $\epsilon_{223}=14,900$, $\epsilon_{231}=14,700$, $\epsilon_{262}=11,500$, $\epsilon_{312}=7,840$, $\epsilon_{241}=1.040$ (methanol).

EXAMPLE 12

2.0 g. of 6β,7α-dibromo-17,20;20,21-bismethylenedioxy-1,4-pregnadiene-3-one are reacted with piperidine as described in Example 1. The crude product is subjected to chromatography through silica gel. With 2.1–6.5% acetone/hexane there are obtained, after recrystallization from acetone/hexane, 1.22 g. of 4-pipridino-17,20;20,21-bismethylenedioxy-1,4,6-pregnatriene-3-one; M.P. 214.5–216° C.

UV: $\epsilon_{228}=11,400$, $\epsilon_{301}=6,260$, $\epsilon_{420}=1,000$ (acetonitrile).

EXAMPLE 13

A solution of 3.0 g. of 6β,7α-dibromo-17-acetoxy-1α,2α-methylene-4-pregnene-3,20-dione in 60 ml. dioxane is reacted with 15 g. of piperazine and heated for 30 minutes by boiling. The reaction mixture is then poured into water and the precipitated product is removed by suction, washed, dried and recrystallized from acetone. There are obtained 1.45 g. of 4-piperazino-17-acetoxy-1α,2α-methylene-4,6-pregnadiene-3,20-dione; M.P. 225–233° C.

UV: $\epsilon_{282}=14,600$, $\epsilon_{392}=1,580$ (acetonitrile).

EXAMPLE 14

2.4 g. of 6β,7α-dibromo-17,20;20,21-bismethylenedioxy-1α,2α-methylene-4-pregnene-3,11-dione are heated in piperidine for one hour in the same manner as in Example 1 and then subjected to further treatment. The crude product is subjected to chromatography through silica gel and is eluted with 6.5–9.0% acetone/pentane. There are obtained 950 mg. of 4-piperidino-17,20;20,21-bismethylenedioxy-1α,2α-methylene-4,6-pregnadiene-3,11-dione; M.P. 121.5–128° C.

UV: $\epsilon_{279}=12,700$, $\epsilon_{395}=1820$ (acetonitrile).

EXAMPLE 15

1.5 g. of 6β,7α-dibromo-17β-acetoxy-1,4-androstadiene-3-one are reacted with morpholine and subjected to further treatment in the same manner as described in Example 2. The crude product is then subjected to chromatography through silica gel. With 7.8–10.3% acetone/hexane there are obtained after recrystallization 785 mg. of 4-morpholino-17β-acetoxy-1,4,6-androstatriene-3-one; M.P. 128–129° C.

UV: $\epsilon_{226}=14,700$, $\epsilon_{303}=10,900$ (acetonitrile).

EXAMPLE 16

A solution of 500 mg. of 4-piperazino-17-acetoxy-1α,2α-methylene-4,6-pregnadiene-3,20-dione in 5 ml. methylene chloride is diluted with 50 ml. diisopropylether and reacted with 5 ml. of a solution of hydrogen chloride in diethylether (8.6 g. HCl in 100 ml.) by adding it dropwise to the solution. The precipitated hydrochloride is removed by suction, washed with diisopropylether and subsequently dried in a vacuum.

There are obtained 449 mg. of 4-piperazino-17-acetoxy-1α,2α-methylene-4,6-pregnadiene-3,20-dione-hydrochloride; M.P. 207–237° C.

UV: $\epsilon_{232}=5780$, $\epsilon_{282}=13,800$, $\epsilon_{363}=1720$ (acetonitrile).

We claim:
1. A 4-aminosteroid compound of the formula

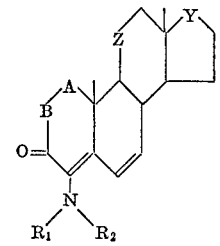

wherein $R_1$ and $R_2$ are each alkyl and wherein $R_1$ and $R_2$ together with the nitrogen to which each is attached can form a ring having up to five carbon atoms, which ring can include an oxygen atom or an additional nitrogen atom, and wherein

B—A represents a member selected from the class consisting of

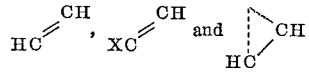

wherein X is halogen, Y represents a member selected frim the class consisting of

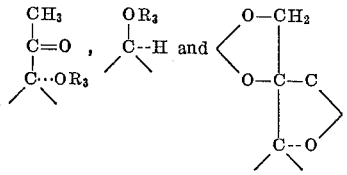

wherein $R_3$ is hydrogen or acyl and Z represents a member selected from the class consisting of

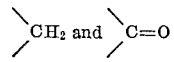

$>C=O$.

2. A 4-aminosteroid compound according to claim 1 wherein $R_3$ is a hydrocarbon carboxylic acyl group of from 1 to 15 carbon atoms.

3. A 4-aminosteroid compound according to claim 1 wherein $R_1$ and $R_2$ are each alkyl and form together with the nitrogen atom to which they are attached a ring containing an additional nitrogen atom, said compound being in the form of a non-toxic, pharmaceutically acceptable, acid addition salt thereof.

4. The compound of claim 1, which is 4-piperidino-17-acetoxy-1α,2α-methylene-4,6-pregnadiene-3,20-dione.

5. The compound of claim 1, which is 4-morpholino-17-acetoxy-1α,2α-methylene-4,6-pregnadiene-3,20-dione.

6. The compound of claim 1, which is pyrrolidino-17-acetoxy-1α,2α-methylene-4,6-pregnadiene-3,10-dione.

7. The compound of claim 1 which is 4-piperidino-17β-acetoxy-1α,2α-methylene-4,6-androstadiene-3-one.

8. The compound of claim 1 which is 4-diethylamino-17-hexanoyloxy-1α,2α-methylene-4,6-pregnadiene-3,20-dione.

9. The compound of claim 1 which is 4-piperidino-17β-acetoxy-1α,2α-methylene-4,6-androstadiene-3-one.

10. The compound of claim 1 which is 4-diethylamino-17β-acetoxy-1α,2α-methylene-4,6-androstadiene-3-one.

11. The compound of claim 1 which is 4-morpholino-17,20;20,21 - bismethylenedioxy - 1α,2α - methylene-4,6-pregnadiene-3-one.

12. The compound of claim 1 which is 4-piperidino-17-acetoxy-1,4,6-pregnatriene-3,20-dione.

13. The compound of claim 1 which is 2-bromo-4-piperidino-17-acetoxy-1,4,6-pregnatriene-3,20-dione.

14. The compound of claim 1 which is 4-piperidino-17,20;20,21-bismethylenedioxy-1,4,6-pregnatriene-3-one.

15. The compound of claim 1 which is 4-piperazino-17-acetoxy-1α,2α-methylene-4,6-pregnadiene-3,20-dione.

16. The compound of claim 1 which is 4-piperazino-17 - acetoxy-1α,2α-methylene-4,6-pregnadiene-3,20-dione-hydrochloride.

17. The compound of claim 1 which is 4-piperidino-17,20;20,21-bismethylenedioxy - 1α,2α - methylene-4,6-pregnadiene-3,11-dione.

18. The compound of claim 1 which is 4-morpholino-17β-acetoxy-1,4,6-androstatriene-3-one.

19. Process of preparing a 4-aminosteroid compound according to claim 1, which comprises reacting a 6β,7α-dihalogenosteroid of the formula

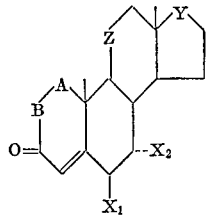

wherein $X_1$ and $X_2$ are each chlorine or bromine and wherein

represents a member selected from the class consisting of

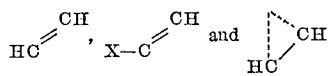

wherein X is halogen; Y represents a member selected from the class consisting of

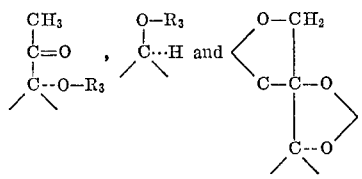

wherein $R_3$ is hydrogen or acyl and Z represents a member selected from the class consisting of $>CH_2$ and $>C=O$ with an amine of the formula

wherein $R_1$ and $R_2$ are as above defined.

20. Process according to claim 19, wherein $R_1$ and $R_2$ are each alkyl and form together with the nitrogen atom to which they are attached a ring containing an additional nitrogen atom, which comprises the additional step of reacting the 4-aminosteroid compound formed with a non-toxic, pharmaceutically acceptable acid to form the corresponding acid addition salt.

21. The process of claim 19, wherein $R_3$ is acyl derived from a carboxylic acid having up to 15 carbon atoms.

22. The process of claim 19, wherein the starting product is 6β,7α-dibromo-17-acetoxy-1α,2α-methylene-4-pregnene-3,20-dione.

23. The process of claim 19, wherein the starting product is 6β,7α-dichloro-17-acetoxy-1α,2α-methylene-4-pregnene-3,20-dione.

24. The process of claim 19, wherein the starting product is 6β,7α-dibromo-17-hexanoyloxy-1α,2α-methylene-4-pregnene-3,20-dione.

25. The process of claim 19, wherein the starting product is 6β,7α-dibromo-17β-acetoxy-1α,2α-methylene-4-androstene-3-one.

26. The process of claim 19, wherein the starting product is 6β,7α-dibromo-17,20;20,21-bismethylenedioxy-1α,2α-methylene-4-pregnene-3-one.

27. The process of claim 19, wherein the starting product is 6β,7α - dibromo-17-acetoxy-1,4-pregnadiene-3,20-dione.

28. The process of claim 19, wherein the starting product is 2,6β,7α-dibromo-17-acetoxy-1,4-pregnadiene-3,20-dione.

29. The process of claim 19, wherein the starting product is 6β,7α-dibromo-17,20;20,21-bismethylenedioxy-1,4-pregnadiene-3-one.

30. The process of claim 19, wherein the starting product is 6β,7α-dibromo-17,20;20,21-bismethylenedioxy-1α,2α-methylene-4-pregnene-3,11-dione.

31. The process of claim 19, wherein the starting product is 6β,7α-dibromo-17β-acetoxy-1,4-androstadiene-3-one.

32. The process of claim 19, wherein the resulting 4-aminosteroid forming together with the nitrogen atom of the amine an additional ring and wherein said additional ring includes a further nitrogen atom is converted into an acid addition salt thereof by a treatment with an acid.

No references cited.

ELBERT L. ROBERTS, Primary Examiner

U.S. Cl. X.R.

260—239.55, 239.55 D, 397.4, 397.45